Patented Aug. 7, 1945

2,381,813

UNITED STATES PATENT OFFICE 2,381,813

TREATMENT OF ANIMAL TISSUE

Joseph Epst, Chicago, Ill.

No Drawing. Application April 26, 1943,
Serial No. 484,603

1 Claim. (Cl. 99—107)

This invention relates to a method of treating animal tissues particularly those of the intestines.

One of the objects of this invention is to provide a method whereby animal intestinal tissue may be rendered tender when stuffed for the production of sausages, frankfurters, or other similar edible products thus making it masticatable, chewable, and palatable, as well as readily digestible when consumed.

Another object of my invention is to provide a method, whereby very tough casings such as hog casings and Indian sheep casings may be readily tenderized to any desired extent and rendered more useful in the manufacture of high grade sausage products which now require tender and expensive casings.

It should be readily understood that this invention is applicable to all types of varieties of animal tissue aside from the particular use indicated in the ensuing description, and by way of illustration, rather than by way of limitation, the invention will be discussed as specifically embodied in the treatment of beef casings, hog casings and Indian sheep casings.

By way of general explanation, it is readily known by those familiar in the art of sausage manufacture that natural casings as distinguished from artificial or synthetic casings, must be prepared from the intestine of edible animals such as cattle, swine, and sheep. After the intestines are removed from the carcass, the food, manure, or other matter in the intestines is removed by means of cleaning or rinsing the same, and by appropriate further means the gut slimes within the casings are broken down and removed, brine solution being commonly used for this purpose. The product resulting after proper treatment is a tubular membrane which is appropriate for use as a retaining membrane for sausage meat, thus providing the usual frankfurter, or sausage, or other type of similar products comprising an edible casing and a prepared filling.

Hog casings are suited for manufacture of frankfurters and other sausages, but due to their toughness they can not be successfully used in the manufacture of pork sausage and may be used only in the manufacture of lower grade of frankfurters because the casing is objectionable to the consumer, it being very tough and difficult to chew and masticate. The same is true of Indian sheep casings. Beef casings are also tough for internal consumption and are normally removed by the consumer before the sausage is eaten.

The present invention contemplates the use of the cheaper price casings such as hog casings or Indian sheep casings making them more adaptable for the higher grade sausage meat products, by tenderizing the same thru the treatment comprising my invention.

Casings after cleaning are usually maintained or kept fresh thru refrigeration and preferably in a brine solution. Prior to applying the treatment comprising my invention, it is advisable to first rinse the casing which may come in certain lengths or in hanks after removal from the carcass of the animal. It is therefore advisable, as a first step, to rinse the casings to free them of the greater portion of the brine solution, the casings after rinsing being placed in a solution made of the following ingredients: One ounce of tartaric acid to ten pounds of water, which is the proportion I have found to be most useful. This solution will have a pH of approximately 2.24.

However, casings may require a different proportion, as it has been my experience with various casings of various degrees of toughness, to find it necessary to use from one to one and one half, or one and three quarter ounces of tartaric acid to ten pounds of water depending on the type of sausage that is being prepared. For frankfurters using sheep casings, I have found that one ounce of tartaric acid to ten pounds of water will make up a suitable solution. For Polish type of fresh pork sausage, one ounce of tartaric acid to ten pounds of water is suitable if hog casings should be used. For smoked pork sausages, one and three quarter ounces of tartaric acid to ten pounds of water, because in pork sausage manufacture the juices of the pork come thru the surface of the casings by osmosis and therefore the liquid matter coming thru has a tendency to absorb some of the tartaric acid solution, therefore the need for a greater proportion of tartaric acid to the same amount of water is found advisable and necessary when treating such sausages for tenderizing.

Various other forms of sausages may require slightly different proportions than those indicated. However, it has been my experience that one familiar with the art of sausage making will have absolutely no difficulty in preparing the proper solution after a few experiments with the various types of casings. To prepare for tenderizing to a suitable degree, twenty five minutes soaking time of the sausage casing in the tartaric acid solution, compounded as heretofore described, will be found adequate.

It may be advisable also, if it is desired to vary the tenderness of the casings to be tenderized, to increase or decrease the time of soaking, the tenderizing being directly proportional to the length of time that the casings are soaked, or the composition of the solution may be changed by using more or less water to dissolve the tartaric acid, and the amount of tartaric acid used is also directly proportional to the tenderness to be produced in the casings to be soaked in the solution.

The treated casings can be kept safely in a brine solution after treatment and before using. It is to be noted that the treatment comprising my invention will not perceptibly change the physical property of the casings, in other words, the tenderizing will be merely of a potential nature so that the treating with the solution will not tend to disturb the operations to follow which are namely, stuffing, or linking, when frankfurters or sausages are being made. It can be readily understood that if the tenderizing took place in the raw casings, that that might cause some difficulty in the stuffing and the linking where a toughness in the casing is more desirable so as to permit the casings to withstand the rough treatment to which they may be subjected during stuffing and linking.

The function of my treatment is to tenderize any type of casings and make them chewable and uniformly edible. The actual tenderizing does not take place until the consumer or the manufacturer heats the product as by boiling in water. Some products are boiled by the manufacturer and then sold in which event the consumer merely heats those products. In that particular case the product is tenderized when the manufacturer boils it. In other products such as the "kosher" style of frankfurter, the product is merely fully and thoroughly smoked, yet the consumer will boil the product prior to eating or consumption, at which time the tenderizing actually takes place.

The ingredients of my solution are harmless to the product and produce no harmful effect to a person consuming products which have been so treated prior to internal consumption. The tartaric acid solution should preferably be made up a short period prior to its use in connection with tenderizing in the proportions heretofore elucidated respecting the treatment comprising my invention.

Altho, I have herein described and specified the manner of treating products such as animal casings with tartaric acid solution, it is understood that the amount of the ingredients their chemical equivalents may be utilized to provide a similar result, and I reserve the right to variations in the compounding of the solution comprising my invention, and also relative to the substitution of chemical equivalents of tartaric acid having the same effect on animal tissues.

Having thus described and revealed my invention what I claim as novel and desire to secure by Letters Patent is:

The method of potentially tenderizing tough animal tissue which comprises soaking the said animal tissue for a period of substantially 25 minutes in a tartaric acid solution having a pH of substantially 2.24, the said soaking operation being performed at room temperature, the said animal tissue being rendered chewable after cooking.

JOSEPH EPST.